United States Patent [19]

Imoto et al.

[11] Patent Number: 5,643,426
[45] Date of Patent: Jul. 1, 1997

[54] ANODE MATERIAL AND METHOD OF MANUFACTURING THE SAME

[75] Inventors: Hiroshi Imoto; Atsuo Omaru; Hideto Azuma; Yoshio Nishi; Yoshihisa Gonno, all of Kanagawa; Masayuki Nagamine, Fukushima, all of Japan

[73] Assignee: Sony Corporation, Japan

[21] Appl. No.: 507,324

[22] PCT Filed: Dec. 28, 1993

[86] PCT No.: PCT/JP93/01929

§ 371 Date: Aug. 23, 1995

§ 102(e) Date: Aug. 23, 1995

[87] PCT Pub. No.: WO95/18467

PCT Pub. Date: Jul. 6, 1995

[51] Int. Cl.$^6$ .................................................. C25B 11/12
[52] U.S. Cl. .......................... 204/294; 429/40; 429/218; 252/502; 423/445 R; 423/460
[58] Field of Search ............................ 204/294; 429/218, 429/40; 252/502; 423/445 R, 460

[56] References Cited

U.S. PATENT DOCUMENTS

| | | | |
|---|---|---|---|
| 4,544,469 | 10/1985 | Boxall et al. | 204/294 |
| 5,306,415 | 4/1994 | Cornec et al. | 423/445 R |
| 5,344,726 | 9/1994 | Tanaka et al. | 423/445 R |
| 5,451,477 | 9/1995 | Omaru et al. | 429/218 |

FOREIGN PATENT DOCUMENTS

| | | |
|---|---|---|
| 58-93176 | 6/1983 | Japan . |
| 61-163562 | 7/1986 | Japan . |
| 2-82466 | 3/1990 | Japan . |
| 60-182670 | 9/1995 | Japan . |

OTHER PUBLICATIONS

International Search Report; Synthetic Metals, 18, (1987) pp. 587–542 No month available.

*Primary Examiner*—Bruce F. Bell
*Attorney, Agent, or Firm*—Ronald P. Kananen

[57] ABSTRACT

An anode material consisting of non-graphitizable carbon material obtained by baking carbon precursor is disclosed. In this non-graphitizable carbon material, ratio by weight of carbon Ps in stacking structure determined from diffraction peak originating in (002) crystal lattice plane and X-ray diffraction spectrum components on the lower angle side with respect to the diffraction peak originating in the (002) crystal lattice plane of X-ray diffraction spectrum is smaller than 0.59, or stacking index SI thereof is smaller than 0.76. Moreover, average number of carbon layers $n_{ave}$ in stacking structure is smaller than 2.46. Alternatively, when baking temperature is T° C. and half width at half maximum of peak appearing in the vicinity of 1340 cm$^{-1}$ in Raman spectrum is HW, the condition expressed below is satisfied.

$$HW > 138 - 0.06 \cdot T$$

This non-graphitizable carbon material is manufactured by allowing carbon precursor which becomes non-graphitizable carbon by baking to undergo heat treatment at temperature 600° C. or more under inactive gas atmosphere of flow rate of 0.1 ml/sec. or more per carbon precursor 1 g, or to undergo heat treatment at temperature 600° C. or more under the atmosphere of pressure less than 50 kPa. At this time, carbon precursor is mounted in a layered form so that the area in contact with the atmosphere is 10 cm$^2$ or more per 1 Kg.

12 Claims, 2 Drawing Sheets

ANODE MATERIAL AND METHOD OF MANUFACTURING THE SAME

DESCRIPTION

1. Technical Field

This invention relates to an anode material used in a non-aqueous electrolyte secondary battery and for doping or undoping lithium, and a method of manufacturing such an anode material.

2. Background Art

With miniaturization of electronic equipments, realization of high energy density of battery has been required. To meet with such requirement, various non-aqueous electrolyte batteries like so called lithium battery have been proposed.

However, e.g., in batteries using lithium metal as anode, particularly in the case where such batteries are caused to be secondary battery, there are following drawbacks. Namely, (1) 5 to 10 hours are ordinarily required for charging, resulting in the fact that quick charge characteristic is poor.

(2) Cycle life-time is short

These drawbacks all result from lithium metal itself, and are considered to be caused by change of lithium form, formation of lithium in dendrite form and/or irreversible change of lithium, etc. produced by repetition of charge/discharge operations.

In view of the above, as one technique for solving these problems, a method using carbonaceous material as anode is proposed. This method utilizes the fact that lithium carbon interlayer compound can be electrochemically formed wise ease. For example, when charge operation is carried out within a non-aqueous electrolyte in the state where carbon is used as an anode and compound including lithium is used as a cathode, lithium in the cathode is electrochemically doped between layers of anode carbon. The carbon into which lithium is doped in this way functions as lithium electrode, and lithium in the anode is undoped from between carbon layers followed by discharge and is returned into the cathode.

We have demonstrated in the Japanese Patent Application Laid Open No. 252053/1991 publication that, as such carbonaceous material, non-graphitizable carbon material having spacing $d_{002}$ of (002) plane of 3.70 angsttoms or more, true density less than 1.70 g/cm$^3$, and no exothermic peak at 700° C. or more in the Differential Thermal Analysis (DTA) in air is excellent in quantity of lithium doped/undoped (hereinafter simply referred to as lithium dope/undope quantity depending upon circumstances).

Meanwhile, in the above-described non-aqueous electrolyte secondary battery using carbonaceous material, current capacity (mAh/g) per unit weight of the anode is determined by quantity of lithium doped of carbonaceous material. Accordingly, it is desirable that lithium dope quantity is as great as possible as the carbonaceous material (Theoretically, ratio of single Li atom to six carbon atoms is upper limit). When viewed from the above, while employment of the above-described carbonaceous material results in a great quantity of lithium being doped as compared to the conventional carbonaceous material, it cannot be said that even such carbonaceous material is sufficient.

DISCLOSURE OF THE INVENTION

An object of this invention is to provide an anode material which has great quantity of lithium doped and is capable of sufficient current capacity, and a method of manufacturing such an anode material.

In order to attain the above-described object, as the result of the fact that the inventors of this invention repeatedly conducted studies for a long time, they have obtained findings that, in non-graphitizable carbon material, ratio by weight of carbon in stacking structure Ps, stacking index SI, and average number of carbon layers $n_{ave}$ in stacking structure are restricted so that ratio (percentage) of the portion forming the stacked layer structure is caused to be small, and the half width at half maximum HW of peak in the vicinity of 1340 cm$^{-1}$ of Raman spectrum is restricted, whereby an anode material having extremely large capacity can be obtained. Further, they have found out that such carbonaceous material is produced by baking (firing) carbon precursor under an atmosphere such that volatile component produced in carbonization is removed to the outside of the reaction system.

The anode material of this invention has been completed on the basis of such findings, and is characterized in that this anode material is non-graphitizable carbon material obtained by baking carbon precursor, and ratio by weight of carbon in stacking structure Ps determined from diffraction peak originating in (002) crystal lattice plane, and X-ray diffraction spectrum components on the lower angle side with respect to the diffraction peak originating in (002) crystal lattice plane of X-ray diffraction spectrum is less than 0.59, or stacking index SI thereof is less than 0.76.

Moreover, the average number of carbon layers $n_{ave}$ in stacking structure portion determined from diffraction peak plane originating in (002) crystal lattice plane and X-ray diffraction spectrum components on the lower angle side with respect to the diffraction peak originating in (002) crystal plane of X-ray diffraction spectrum is less than 2.46.

Further, the anode material of this invention is non-graphitizable carbon material obtained by baking carbon precursor, and when baking temperature is T° C. and half width at half maximum of peak appearing in the vicinity of 1340 cm$^{-1}$ in Raman spectrum is HW, the condition expressed below $$HW > 138 - 0.06 \cdot T$$

is satisfied.

Moreover, a method of manufacturing anode material of this invention is characterized in that carbon precursor which becomes non-graphitizable carbon by baking is caused to undergo heat treatment at temperature of 600° C. or more under the inactive gas atmosphere of flow rate of 0.1 ml/second or more per carbon precursor 1g.

Further, the method of this invention is characterized in that carbon precursor which becomes non-graphitizable carbon by baking is caused to undergo heat treatment at temperature 600° C. or more under the atmosphere of pressure less than 50 kPa.

Further, the method of this invention is characterized in that, in carrying out heat treatment of carbon precursor, the carbon precursor is mounted in a layer form so that the area in contact with the atmosphere is 10 cm$^2$ or more per 1 kg.

Non-graphitizable carbon material in which ratio by weight of carbon in stacking structure Ps, stacking index SI, and the average number of carbon layers $n_{ave}$ in stacking structure, which are parameters reflecting the ratio (percentage) that carbon atoms take stacked layer structure in non-graphitizable carbon material satisfy a predetermined condition has a lithium dope quantity far greater than ideal lithium dope quantity 372 mAh/g obtained on the assumption that when such carbon material is used as anode material of lithium non-aqueous electrolyte battery, lithium is doped only between carbon layers of the stacked layer structure portion. It is considered that this is because non-graphitizable carbon material in which the above-mentioned parameters satisfy the predetermined condition has a large number of micro (very small) vacancy at site where lithium is doped except for carbon layer of the stacked layer structure portion.

Such non-graphitizable carbon material is obtained by carbonizing carbon precursor which becomes non-graphitizable carbon by baking in an atmosphere where volatile component produced in carbonization is removed to the outside of the system of reaction such that heat treatment is conducted at temperature of 600° C. or more under the inactive gas atmosphere of flow rate of 0.1 ml/min or more per carbon precursor 1 g, or under the atmosphere of pressure less than 50 kPa. This is based on the following reason.

Namely, when the carbon precursor is baked, low molecular paraffin, olefin, or low molecular aromatic family is volatilized from a temperature in the vicinity of 400° C., carbon dioxide, methane and carbon oxide are volatilized at about 600° C., and hydrogen is volatilized at a higher temperature. Volatilization of low molecular compound at a lower temperature is based on cleavage of carbon-oxygen bond, or carbon-carbon single bond in carbonaceous material. The carbonaceous material forms olefin or aromatic ring having more stable double bond. At a higher temperature, hydrogen is desorbed together with cleavage of carbon-hydrogen bond. As a result, polymerization is developed, and aromatic ring is grown. Elimination of volatile component to the outside of reaction system in such carbonization process promotes formation of vacancy along diffusion path of the volatile component in carbon material particles. It is unknown that such vacancy forms opened pore or closed pore. However, it is estimated that a vacancy resulting from diffusion of molecule has a very small capacity. It is thus considered that such vacancy takes the structure which reasonably contributes to capacity.

As stated above, the anode material of this invention is non-graphitizable carbon material obtained by baking carbon precursor, and weigh ratio Ps, stacking index SI and average number of carbon layers $n_{ave}$ in stacking structure determined from diffraction peak originating in (002) crystal lattice plane, and X-ray diffraction spectrum components on the lower angle side with respect to the diffraction peak originating in (002) crystal lattice plane of X-ray diffraction spectrum, and half width at half maximum HW of peak appearing in the vicinity of 1340 $cm^{-1}$ in Raman spectrum are restricted. Accordingly, in the case where such carbon material is used as anode material of lithium non-aqueous electrolyte battery, quantity of lithium doped far greater than theoretical value can be obtained.

In addition, such anode material is obtained by allowing carbon precursor which become non-graphitizable carbon by baking to undergo heat treatment at temperature of 600° or more under the inactive gas atmosphere of flow rate of 0.1 ml/min. or more per precursor 1 g, or under the atmosphere of pressure less than 50 kPa, and any additional operation except for manufacturing operations until now such as addition of additive into material is unnecessary. Accordingly, this invention is advantageous to simplification of manufacturing operation and reduction of cost. Therefore, the industrial value is extremely great.

BEST MODE FOR CARRYING OUT THE INVENTION

In this invention, in order to obtain anode material having great lithium dope quantity, non-graphitizable carbon material in which ratio by weight of carbon in stacking structure Ps, stacking index SI and average number of carbon layers $n_{ave}$ in stacking structure, which are parameters reflecting the ratio of the portion where carbon atoms take stacked layer structure in non-graphitizable carbon material, satisfy the following condition is used as an anode material:

$$Ps < 0.59$$
$$SI < 0.76$$
$$n_{ave} < 2.46$$

Namely, non-graphitizable carbon material means carbon material such that graphitization is not easily developed even after undergone high temperature heat treatment such as 3000° C. In this embodiment, it is assumed that non-graphitizable carbon material indicates carbon material in which $d_{002}$ value after undergone heat treatment at 2600° C. is 3.40 angstroms or more.

Such non-graphitizable carbon material consists of stacked layer structure portion in which carbon atoms take stacked layer structure and non-stacked layer structure portion. Here, it is considered that in the case where non-graphitizable carbon material is used as anode material, lithium is not only doped into between carbon layers of the stacked layer structure portion, but also is doped into micro (very small) vacancy of disturbed carbon layer of the non-stacked layer structure portion. With respect to vacancy in which volume is too large of very small vacancy, lithium is unable to remain therein, so such vacancy do not contribute doping of lithium. However, with respect to very small vacancy in which volume is reasonably small, lithium can remain therein. Such very small vacancy can contribute to doping of lithium. In the case where a large number of very small vacancy stated above exist, lithium dope quantity far greater than ideal lithium dope quantity 372 mAh/g determined on the assumption that lithium is doped only between carbon layers can be obtained.

When it is assumed that density of non-graphitizable carbon material is substantially fixed, according as ratio of the non-stacked layer structure portion becomes greater, i.e., ratio of the stacked layer structure portion becomes smaller, a larger number of such very small vacancy of the non-stacked layer structure portion exist.

Non-graphitizable carbon material in which parameters Ps, SI, $n_{ave}$ reflecting ratio of the stacked layer structure portion satisfies the above-described condition, which is proposed as anode material in this invention, is non-graphitizable carbon material in which ratio of the stacked layer structure is small, and includes many very small vacancy at the non-stacked layer structure portion. Accordingly, such large number of very small vacancy effectively contribute to doping of lithium. Thus, large lithium dope quantity can be obtained.

Here, parameters Ps, SI, $n_{ave}$ reflecting ratio of the stacked layer structure portion are determined by carrying out data processing, in accordance with a predetermined procedure, data obtained from diffraction peak originating in (002) crystal lattice plane and spectrum component on the lower angle side with respect to the diffraction peak originating in (002) crystal lattice plane of X-ray diffraction spectrum of the non-graphitizable carbon material.

As the data processing method for determining the above-mentioned parameters, there is a method disclosed formerly in R. E. Franklin [Acta Cryst., 3, 107 (1950)], and also partially described in detail in H. P. Klug and L. E. Alexander, X-ray diffraction Procedures, p. 793 (John Wiley and Sons, Inc.). This method is applied in Shiraishi, Sanada, Bulletin of Chemical Society of Japan, 1976, No. 1, p.153, Ogawa, Kobayashi, Carbon, 1985, No. 120, p-28, and M. Shiraishi, K. Kobayashi, Bulletin of Chemical Society of Japan, 46, 2575, (1973), etc., and is widely recognized.

In this invention, SI, Ps, $n_{ave}$ are determined by a simple method which is in conformity with the method disclosed in the above-mentioned literatures, but is partially simplified for carrying it out more easily.

The data processing procedure of the simple method will be described below.

(1) Initially, X-ray diffraction spectrum of non-graphitizable carbon material sample in which SI, Ps and $n_{ave}$ are to be determined is observed. With respect to the X-ray diffraction spectrum, correction is made by dividing diffraction intensity $I(\theta)$ by squares of polarization factor, absorption factor determined by the following formulas (1) and (2) and atomic scattering factor. It is to be noted that while the atomic scattering factor is defined as a function of $\sin \theta/\lambda$, there is used, for obtaining this factor, an approximate value with respect to carbon atom which is not in valence state described in International Tables for X-ray Crystallography, vol. IV, p71 (The kynoch Press, 1974). In addition, diffraction intensity $I(\theta)$ may be either X-ray count value per second or X-ray count value, and is an arbitrary intensity.

$$\text{Polarization factor} = \frac{1 + \cos^2 2\theta \cdot \cos^2 2\alpha}{1 + \cos^2 2\alpha} \quad (1)$$

$$\text{Absorption factor} = \left( \sec\theta - \frac{t}{A} \cdot \tan\theta \right) \cdot \quad (2)$$

$$\exp[-\mu \cdot t \cdot (\sec\theta - 1)]$$

$$; 0 < t < \left( \frac{A}{2} \right) \cdot \operatorname{cosec}\theta$$

$$= \left( \frac{A}{2 \cdot t} \right) \cdot \operatorname{cosec} 2\theta \cdot$$

$$\exp[-\mu \cdot t \cdot (\sec\theta - 1)]$$

$$; t \geq \left( \frac{A}{2} \right) \cdot \operatorname{cosec}\theta$$

Figure 1:
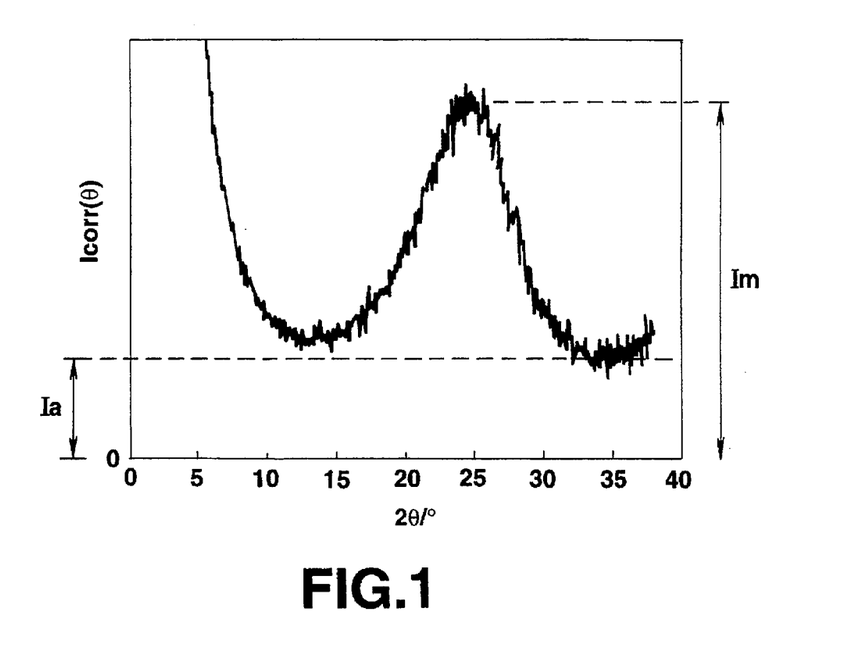
FIG. 1 is a characteristic diagram showing curve Icorr (θ) obtained by correcting X-ray diffraction spectrum of non-graphitizable carbon material.

In the above-mentioned formulas,

A: width when X-ray impinge on the sample surface, which is indicated by $A = 1 \cdot \sin \beta$ when distance from X-ray source to the sample is 1 and width of divergence slit is $\beta$, t: thickness of sample $\mu$: linear absorption coefficient of sample given by product of mass absorption coefficient (4.17) and specific gravity of sample $\alpha$: half of diffraction angle of monochrometer (2) Curve Icorr ($\theta$) obtained by correcting X-ray diffraction spectrum is shown in FIG. 1. As seen from FIG. 1, there is a minimum value in the vicinity of $2\theta$=about 36 degrees in this curve Icorr ($\theta$). This minimum value is assumed to be Ia, and peak intensity of peak originating in (002) crystal lattice place is assumed to be Im. In this case, it is preferable to implement smoothing processing in advance with respect to about 15 to 35 points in the range of $2\theta=15°\sim38°$ for the purpose of avoiding the influence of noise in signal. Then, by substituting Im, Ia determined in this way for the following formula (3), SI value is determined.

$$SI = \frac{Im - Ia}{Im} \quad (3)$$

Figure 2:
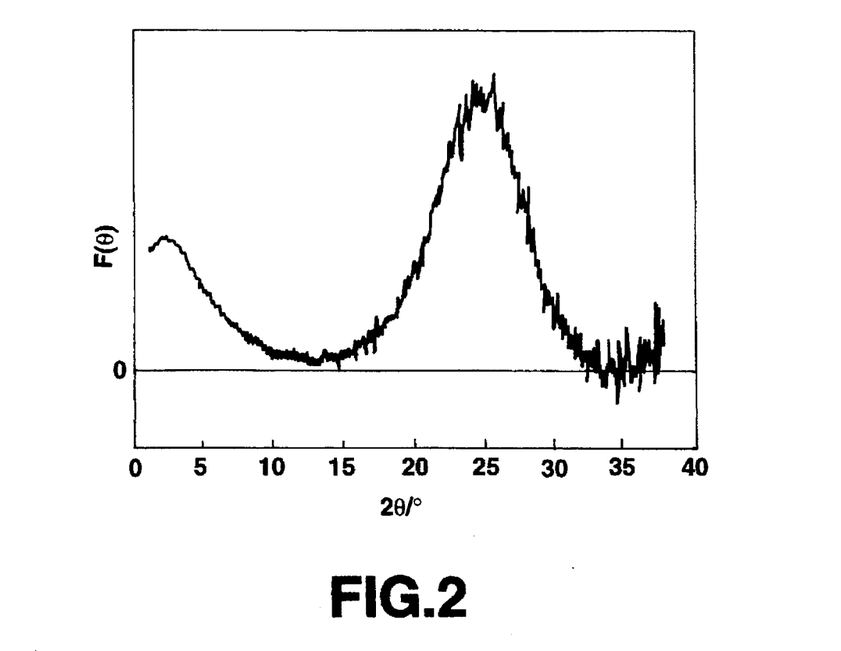
FIG. 2 is a characteristic diagram showing curve F(θ) obtained by subtracting minimum value Ia from the curve Icorr(θ) to multiply it by sin (θ).

(3) On the other hand, minimum value Ia is subtracted from curve Icorr ($\theta$) to which no smoothing processing is implemented to multiply the subtracted value by $\sin \theta$ to determine intensity $F(\theta)$. Curve $F(\theta)$ thus obtained is shown in FIG. 2.

Figure 3:
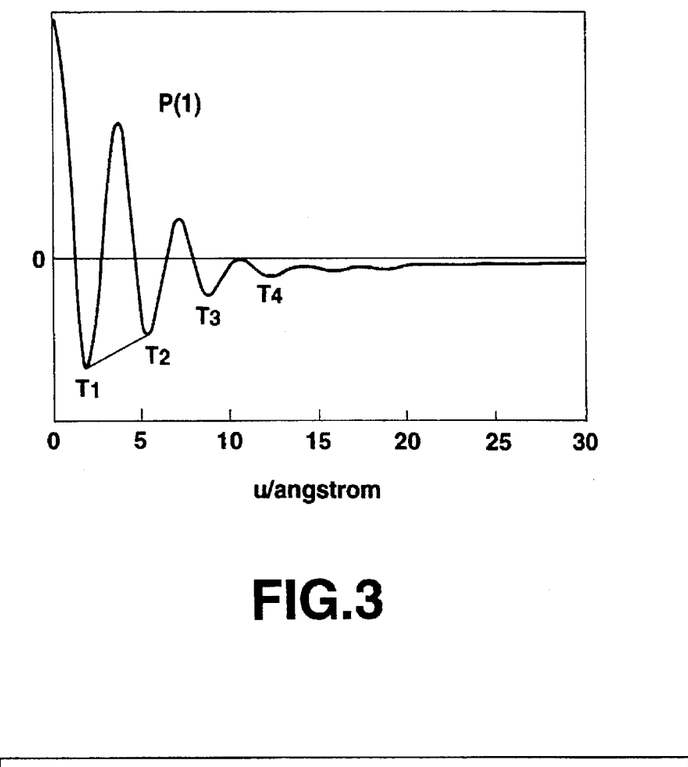
FIG. 3 is a characteristic diagram showing Patterson function curve obtained by implementing Fourier transform processing to curve F(θ).

(4) The curve $F(\theta)$ thus obtained is substituted for the following formula (4) to determine Patterson function.

$$\Sigma \left[ F(\theta) \cdot \cos\left( \frac{4 \cdot \pi \cdot u \cdot \sin\theta}{\lambda} \right) \cdot \cos\theta \cdot \Delta\theta \right] \quad (4)$$

This formula (4) is obtained by replacing ordinary Fourier transform formula $\int F \cos(2\cdot\pi\cdot u\cdot s)\cdot ds$ ($s=2\cdot\sin \theta/\lambda$) by formula of sum total at $\theta$. The determined Patterson function curve is shown in FIG. 3. As shown, the transform range to the real space of Patterson function is caused to be broad until reference (value) is sufficiently attenuated. Points u giving minimum values of the Patterson function curve are assumed to be $T_1, T_2, \ldots T_n$ in reverse order of magnitude to respectively determine areas p(n) encompassed by straight line and the Patterson function between $T_n$ and $T_{n+1}$.

(5) Ratio by weight of carbon in stacks of n layers in stacking structure, in the non-graphitizable carbon material is determined by the following formula (5) by using p(n).

$$f(n) = \frac{p(n-1) - 2 \cdot p(n) + p(n+1)}{p(1) - p(2)} \quad (5)$$

$$n \geq 2$$

In this case, calculation of f(n) indicated by the formula (5) is carried out up to n which is smaller by one than n when f(n) value becomes 0 or negative for the first time.

Then, $n_{ave}$ is determined by the following formula (6) by using the determined f(n).

$$n_{ave} = \frac{\Sigma f(n)}{\Sigma \frac{f(n)}{n}} \quad (6)$$

Figure 4:
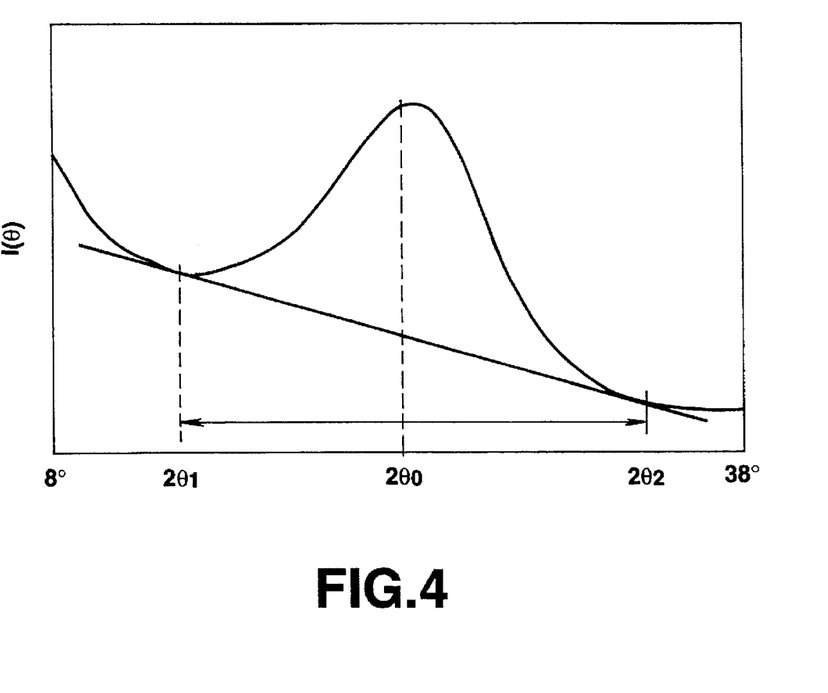
FIG. 4 is a characteristic diagram showing curve I(θ) obtained by allowing X-ray diffraction spectrum to undergo smoothing processing.

(6) Then, spacing $d_{002}$ of (002) crystal lattice plane is determined in the following manner. Namely, with respect to diffraction peak originating in the (002) crystal lattice plane of the X-ray diffraction spectrum observed in (1), smoothing processing of about 15 to 35 points is implemented. Curve $I(\theta)$ obtained by allowing X-ray diffraction spectrum to undergo smoothing processing is shown in FIG. 4. Then, as shown in FIG. 4, base line is drawn with respect to diffraction peak of the curve $I(\theta)$ to integrate the portion encompassed by the base line and the diffraction peak between both contact points of the diffraction peak and the base line. By substituting $2\theta$ just halving the integral intensity for the formula of Bragg, $d_{002}$ is determined.

(7) By using values of $n_{ave}$, SI and $d_{002}$ determined in a manner as described above, ratio by weight of carbon in stacking structure Ps is determined by the following formula (7).

$$Ps = \frac{SI}{SI \cdot (1 - Isp) + Isp} \quad (7)$$

In the above formula, $Isp = 0.0606 \cdot n_{ave} \cdot d_{002}^2$

The data processing procedure for determining SI, $n_{ave}$, Ps has been described. While SI of these parameters is determined by the method called a transmission method, it is not necessarily required to determine this parameter by this method, but a reflection method ordinarily used may be employed to make correction by suitable absorption factor, etc. to determine such parameter. In addition, it is possible to derive parameter which correlates with SI also from values corresponding to Im, Ia of uncorrected I(θ) curve although many errors are included.

Non-graphitizable carbon material in which SI, $n_{ave}$ and Ps determined in this way satisfy the predetermined condition exhibits high lithium dope quantity. Further, in this invention, there is also used, as anode material, non-graphitizable carbon material in which half width at half maximum HW of peak appearing in the vicinity of 1340 cm$^{-1}$ in Raman spectrum satisfies the following condition:

$$HW > 138 - 0.06 \cdot T$$

Namely, when Raman spectrum is observed with respect to non-graphitizable carbon material, peaks can be observed in the vicinity of 1340 cm$^{-1}$ and in the vicinity of 1580 cm$^{-1}$. The peak in the vicinity of 1580 cm$^{-1}$ originates in graphite structure in which carbon atoms are strongly coupled to each other, i.e., the above-described stacked layer structure portion. On the other hand, the peak in the vicinity of 1340 cm$^{-1}$ originates in phase where symmetrical property is inferior to that of graphite structure in which carbon atoms are weakly coupled to each other, i.e., the above-described non-stacked layer structure portion. The half width at half maximum HW of peak in the vicinity of 1340 cm$^{31}$ reflects degree of unevenness of coupling state between carbon atoms at the non-stacked layer structure portion.

It is estimated that in the case where the half width at half maximum HW is greater than 138–0.06·T, unevenness of (coupling state between) carbon atoms in the non-stacked layer structure portion is reasonably great and there are a large number of very small pores contributing to lithium doping. In such a case, great lithium dope quantity can be obtained.

It is to be noted that the half width at half maximum of peak in the vicinity of 1340 cm$^{31}$ mentioned here is a value which is one half of a value ordinarily called half-power band width. Namely, base line is drawn with respect to peak waveform of Raman spectrum which has been subjected to fitting to draw a straight line in parallel to base line at the point where intensity from peak top up to the base line is ½. Intersecting points of the peak waveform and the straight line are assumed to be points A, B to read abscissa corresponding to these points A, B. Difference between read values of the abscissa corresponding to points A, B is a half-power band width, and value which is one half of the half-power band width is half width at half maximum.

Such non-graphitizable carbon material can be obtained by baking carbon precursor exemplified below.

Namely, as precursor of the non-graphitizable carbon, there are enumerated material in which functional group including oxygen is introduced into petroleum pitch, and carbon material in which solid phase carbonization is developed via thermosetting resin, etc.

For example, the above-mentioned petroleum pitch is obtained tar family obtained by high temperature thermal decomposition such as coal tar, ethylene bottom oil or crude oil, etc. by operation such as distillation (vacuum distillation, ordinary pressure distillation, steam distillation) thermal polymerization/condensation, extraction, or chemical polymerization/condensation, etc. At this time, H/C atom ratio of petroleum pitch is required to have 0.6~0.8 in order to allow it to be non-graphitizable carbon.

Practical means for introducing functional group including oxygen into such petroleum pitch is not limited, but, e.g., wet method by aqueous solution of nitric acid, mixed acid, sulfuric acid or hypochlorous acid, dry method by oxidizing gas (air, oxygen), and reaction by solid reagent such as sulfur, ammonium nitrate, ammonium persulfate, or ferric chloride, etc. are used.

Although oxygen percentage content is not particularly prescribed, it is preferably 3% or more, and is more preferably 5% or more as disclosed in the Japanese Patent Application Laid Open No. 252053/1991. This oxygen percentage content affects crystal structure of carbonaceous material finally produced. When the oxygen percentage content is caused to be in the above-mentioned range, there results material having spacing $d_{002}$ of (002) plane of 3.70 angstroms or more, no exothermic peak at a temperature of 700° C. or more in Differential Thermal Analysis (DTA) in air flow, and large anode capacity.

On the other hand, as organic material serving as precursor, phenol resin, acryl resin, vinyl halide resin, polyimide resin, polyamideimide resin, polyamide resin, polyacetylene, conjugate resin such as poly (p-phenylene), etc., cellulose and its derivative, and arbitrary organic high molecular compound can be used. In addition, condensed polycyclic hydro carbon compound such as naphthalene, phenanthrene, anthracene, triphenylene, pyrene, perylene, pentaphene, or pentacene, etc., other derivatives (e.g., carbonate, carboxylic anhydride, carboxylic imide thereof, etc.), various pitches including mixtures of the above-mentioned respective compounds as major component, condensed heterocyclic compound such as acenaphthalene, indol, isoindol, quinoline, isoquinoline, quinoxaline, phthalazine, carbazole, acridine, phenazine, phenanthridine, etc., and other derivatives may be used. In addition, particularly furan resin consisting of homo polymer or copolymer of furfuryl alcohol or furfural is also suitable.

Material which undergoes liquid phase carbonization along with heat treatment of the above-mentioned organic materials gives easily graphitizable carbon. It is sufficient to implement non-fusion processing to such organic materials so as to undergo solid phase carbonization. Namely, it is sufficient to make a device such that crosslinking reaction between molecules starts at a temperature lower than the temperature at which fusion starts, e.g., there is employed a method of introducing oxygen included group by a method similar to the method of implementing processing to the petroleum pitch, a method of adding chlorine gas or sulphur, or a method of allowing catalyst for promoting crosslinking reaction to exist, etc.

While carbonaceous material can be obtained by baking the carbon precursors exemplified above, baking atmosphere in baking carbon precursor is important in order to obtain carbonaceous material having great lithium dope quantity.

Namely, in this invention, baking of carbon precursor is carried out under the inactive gas atmosphere of flow rate of 0.1 ml/second per carbon precursor of 1 g, or under the atmosphere of pressure less than 50 kPa. When baking of carbon precursor is carried out under the inactive gas atmosphere of flow rate of 0.1 ml/second or more per carbon precursor of 1 g, volatile component is eliminated by flow of inactive gas. On the other hand, when baking of carbon precursor is carried out under the low pressure atmosphere of pressure less than 50 kPa, diffusion/desorption of volatile component from the carbon precursor is promoted, and volatile component is thus efficiently eliminated. When baking of carbon precursor is carried out under an atmosphere such that volatile component produced by carbonization is eliminated from the outside of reaction system, carbonization is smoothly developed. Thus, carbonaceous material having great lithium dope quantity can be obtained.

First, in the case where carbon precursor is baked under the inactive gas atmosphere of flow rate of 0.1 ml/second or more per carbon precursor of 1 g, inactive gas is gas which does not react on carbonaceous material at carbonization temperature of 900° C. ~1500° C. When exemplification is made, this inactive gas is gas including, as major component, nitrogen, argon, or mixed gas thereof.

Moreover, at this time, to what degree volatile component is gone is dependent upon not only flow rate of the atmosphere, but also quantity of carbon precursor forwarded to carbonization. Accordingly, in this embodiment, the flow rate of the atmosphere is prescribed by flow rate per carbon precursor unit weight. When flow rate per carbon precursor 1 g is 0.1 ml/second or more, improvement in anode capacity results.

It is to be noted that quantity of carbon precursor indicates total quantity within furnace in the case of the batch type carbonization furnace, and indicates quantity of carbon precursor heated preferably up to 800° C. or more and more preferably up to 700° C. or more in the case of continuous type carbonization furnace in which carbon precursor is thrown with the passage of time and carbonaceous material is taken out therefrom.

Further, inactive atmosphere flow rate is caused to be a quantity sufficient to be in contact with carbon precursor heated preferably up to temperature of 800° C. or more and more preferably to temperature of 700° C. or more and to be exhausted to the outside of the carbonization furnace. Accordingly, flow of the inactive atmosphere with a view to replacement of the atmosphere within the system before temperature of carbonization furnace or carbon precursor is elevated preferably up to 800° C. and more preferably up to 700° C. is not included in this invention.

It is to be noted that when the area in contact with the atmosphere per carbon precursor 1 g is assumed to be 10 $cm^2$ or more in rough surface form, carbon precursor is apt to be in contact with inactive gas, so volatile component is more efficiently removed and development of carbonization is more smoothly conducted. In this case, the contact area in rough form mentioned here does not include random very small unevenness of the material surface, or very small specific surface area within particle.

By, e.g., dividing carbon precursor to stack them in multi-stage form, or agitating it (in this case, the specific surface area of carbon precursor becomes area in contact with the atmosphere), contact area of carbon precursor can be broadened.

On the other hand, in the case where carbon precursor is baked under the low pressure atmosphere of pressure less than 50 kPa, it is sufficient that pressure under the atmosphere is kept so that it is less than 50 kPa at the time when temperature is elevated so that carbonization is attained or at a certain time during temperature elevation. It is sufficient that evacuation within carbonization furnace may be carried out before carbonization furnace or carbon precursor is heated, or in the process of temperature elevation thereof or for a time period during which temperature at which carbonization is attained is held.

It is to be noted that in the case where carbonization (baking of carbon precursor) is carried out under any atmosphere, heating system of the carbonization furnace is not particularly limited, and induction heating or resistance heating, etc. may be employed for this purpose.

Moreover, arrival temperature and/or temperature elevation speed in carbonization are not particularly limited. For example, after provisional baking is carried out at 300°~700° C. during inactive atmosphere, regular baking may be carried out under the condition of temperature elevation speed of 1° C./second or more, arrival temperature of 900°~1500° C., holding time at the arrival temperature of about 0 to 5 hours during the inactive atmosphere. Of course, provisional baking operation may be omitted depending upon circumstances.

Further, carbonaceous material obtained in this way is crushed and sieved so that they are used (applied) as anode material. Such crushing may be carried out at any time before carbonization, after carbonization, or after baking.

An anode consisting of the anode material made up in a manner as described above is accommodated into a battery can along with cathode and electrolytic solution, and functions as anode of the battery.

Here, since the non-aqueous electrolyte secondary battery of this invention aims at attaining high capacity, it is necessary for cathode to include Li corresponding to charge/discharge capacity of 250 mAh or more per anode carbonaceous material 1 g in a steady state (after about five times of charge/discharge operations are repeated), it is preferable to include Li corresponding to charge/discharge capacity of 300 mAh or more, and it is more preferable to include Li corresponding to charge/discharge capacity of 350 mAh or more.

It is to be noted that it is not necessarily required that Li is entirely delivered from the cathode material. In a short, it is sufficient that Li corresponding to charge/discharge capacity of 250 mAh or more per anode carbonaceous material 1 g exists within the battery system. Moreover, it is assumed that quantity of this Li is judged by measuring discharge capacity of the battery.

For cathode material constituting the cathode, e.g., compound metal oxide indicated by general expression LIMO2 (M indicates at least one kind of Co and Ni), or interlayer compound including Li is suitable, and satisfactory characteristic is obtained particularly when $LiCoO_2$ is used.

Moreover, while non-aqueous electrolytic solution is prepared by suitably combining organic solvent and electrolyte, any materials which are used in batteries of this kind may be used as such organic solvent and/or electrolyte.

When exemplification is made, as the organic solvent, there are propylene carbonate, ethylene carbonate, diethyl carbonate, dimethyl carbonate, 1,2-dimethoxy ethane, 1,2-diethoxy ethane, γ-butyrolactone, tetrahydrofuran, 2-methyl tetrahydrofuran, 1,3-dioxysolan, 4-methy-1,3-dioxysolan, diethyl ether, sulforan, methyl sulforan, acetonitrile, propionitrile, anisole, acetic ester, butyric ester, propionic ester, etc.

As the electrolyte, there are $LiClO_4$, $LiAsF_6$, $LiPF_6$, $LiBF_4$, $LiB(C_6H_5)_4$, $CH_3SO_3Li$, $CF_3SO_3Li$, LiCl, LiBr etc.

This invention will be described below on the basis of practical experimental results.

Embodiment 1

First, carbonaceous material was manufactured as follows.

Petroleum pitch (H/C atomic ratio: 0.6~0.8) was oxidized to prepare carbon precursor of oxygen percentage content of 15.4%. Then, this carbon precursor was carbonized at 500° C. for 5 hours in nitrogen gas flow. Then, beads obtained by carbonization were crushed by mill so that carbonized material is provided. About 10 g of the carbonized material was contained (laid) into crucible. The carbonized material of 10 g laid into the crucible was baked under the condition of nitrogen gas flow of 10l/min., temperature elevation speed of 5° C./min., arrival temperature of 1100° C., and holding time of 1 hour within an electric furnace. Thus, carbonaceous material was obtained. Layer thickness of carbonized material within the crucible at this time was about 30 mm, and the area in contact with nitrogen gas flow was ~7 cm$^2$.

After the carbonaceous material thus obtained is cooled, it is crushed within mortar, and is sieved into particles less than 38 μm by mesh.

With respect to the carbonaceous material, Raman scattering spectrum and X-ray diffraction spectrum were measured. Then, half width at half maximum of peak appearing in the vicinity of 1340 cm$^{-1}$ in Raman scattering spectrum was determined. Further, data obtained from the X-ray diffraction spectrum was subjected to data processing in accordance with a predetermined procedure to thereby determine ratio by weight of carbon in stacking structure Ps, stacking index SI and average number of carbon layers $n_{ave}$ in stacking structure.

Half width at half maximum of peak appearing in the vicinity of 1340 cm$^{-1}$ in Raman scattering spectrum was determined as follows.

Initially, Ar$^+$ laser beams of wavelength of 514.5 nm and irradiation power of 200 mW are irradiated to carbonaceous material powder sample under the condition of incident beam diameter of 1 mm to converge scattered light pseudo-backward scattering to optically separate the converged light by using spectrometer to thereby measure Raman spectrum. In the case of this method, since beam diameter of Ar$^+$ laser beams for obtaining scattered light is large value of 1 mm, Raman scattering spectrum measured becomes scattering mean (average value) of a large number of carbon material particles existing within the beam diameter. Accordingly, Raman spectrum is measured with high reproducibility and accuracy.

In this example, double monochrometer manufactured by JOBIN-YVON COMPANY and Trade Name U-1000 was used as the spectroscope (spectrometer). The slit width is 400-800-800-400 μm.

Four times of Raman scattering spectrum measurements in total were conducted similarly except that irradiation position is shifted to carry out fitting processing with respect to respective Raman spectrum components. Then, half width at half maximum values of peak in the vicinity of 1340 cm$^{-1}$ were determined with respect to respective spectrum components to calculate average value of four half width at half maximum data to allow the average value thus calculated to be half width at half maximum.

Moreover, X-ray diffraction spectrum was measured by the following condition.

```
X-ray diffraction measurement condition
X ray: CuKα ray (wavelength λ = 1.5418 angstroms)
Measurement device: Trade Name RAD-IIIB by Rigaku sha
Application voltage and Application current: 40 kV, 30 mA
Solar slit width: 0.5 degrees
Divergence slit width: 0.5 degrees
Reference slit width: 0.15 degrees
```

```
Sampling interval: 0.05 degrees
Scanning speed: 1 degrees/min.
Scanning width: 1~38 degrees at 2θ
Graphite monochrometer is used
(diffraction angle 2α of monochrometer: about
26.6 degrees)
Sample filling system:
  Sample is filled into opening portion
  of 5 mm × 18 mm bored at a plate made
  of SUS of thickness of 0.5 mm so that
  thickness is equal to 0.5 mm.
```

HW, Ps, SI, $n_{ave}$ determined by the above-mentioned method and condition are shown in Table 1.

Moreover, the above-mentioned carbonaceous material was used as anode material to make up anode of a coin type battery to measure anode capacity of the carbonaceous material.

Initially, in order to make up anode, pre-heat treatment was implemented to the carbonaceous material under the condition of temperature elevation speed of about 30° C./min, arrival temperature of 600° C. and arrival temperature holding time of one hour during the argon atmosphere (It is to be noted this heat treatment was carried out immediately before adjustment of anode mix indicated below). Then, polyvinylidene fluoride corresponding to 10 weight % was added to the carbonaceous material to mix dimethyl formamide as solvent to dry it to prepare anode mix.

The anode mix 37 mg prepared in this way was mixed with nickel mesh serving as collector (electricity collecting body) to mold it into pellet of diameter of 15.5 mm thus to prepare anode.

Then, the anode thus made up was assembled into a coin type battery of the configuration indicated below to carry out charge/discharge at 1 mA (current density 0.53 mA/cm$^2$) to measure discharge capacity per anode carbonaceous material 1 g. The configuration and the charge/discharge condition of the coin type battery were indicated below.

```
Configuration of the coin type battery
Coin type battery dimensions: diameter 200 mm,
thickness 2.5 mm
Cathode: Li metal
Separator: porous film (polypropylene)
Electrolytic solution:
  solution in which LiClO$_4$ is dissolved
  into mixed solvent of propylene
  carbonate and dimethoxyethane (1:1 in
  terms of volume ratio) with a ratio
  of 1 mol/l.
Collector: Copper foil
Charge/Discharge condition
```

Charge: current-imposition of one hour and relaxation of two hours were repeated to extrapolate plot of power of (−½) of relaxation time versus relaxation voltage at times of respective relaxation of operations with respect to indefinite time to estimate equilibrium potential at each charge capacity (intermittent charge/discharge method). Charge was assumed to be completed when this equilibrium potential reaches 2 mV against the lithium electrode.

Discharge: current-imposition of one hour and relaxation of two hours are repeated similarly to the chargeoperation to complete discharge at the time point when the battery voltage is below 1.5 volts in closed circuit state.

Since charge/discharge capacity estimated by this method uses equilibrium potential as reference, the charge/discharge capacity reflects the characteristic inherent in the material.

Anode capacity of carbonaceous material measured in this way is shown in Table 1 along with the above-described HW, SI, Ps and $n_{ave}$.

TABLE 1

|  | Ps | SI | $n_{ave}$ | HW (cm$^{-1}$) | 138 − 0.06 · T | ANODE CAPACITY (mAg/g) |
|---|---|---|---|---|---|---|
| EMBODIMENT 1 | 0.531 | 0.700 | 2.437 | 76 | 72 | 378 |

COMPARATIVE EXAMPLE 1

Carbonaceous material was manufactured similarly to the embodiment 1 except that baking of carbonized material is not carried out under the nitrogen gas flow. In this example, arrival temperature in baking was changed in a manner of 1100° C., 1200° C. and 1300° C.

Raman spectrum and X-ray diffraction spectrum were measured with respect to the carbonaceous material thus obtained to determine half width at half maximum of peak appearing in the vicinity of 1340 cm$^{-1}$ in the Raman scattering spectrum to implement a predetermined data processing to data obtained from the X-ray diffraction spectrum to thereby determine ratio by weight of carbon in stacking structure Ps, stacking index SI and average number of carbon layers $n_{ave}$ in stacking structure. Moreover, the carbonaceous material was used as anode material to make up a coin type battery to carry out charge/discharge under the current-imposed condition of 1 mA with respect to the manufactured coin type battery to measure discharge capacity per anode carbonaceous material 1 g. Measured results of HW, Ps, SI, $n_{ave}$ and anode capacity were shown in Table 2.

TABLE 2A

|  | BAKING TEMPERATURE | Ps | SI | $n_{ave}$ |
|---|---|---|---|---|
| COMPARATIVE EXAMPLE | 1100 | 0.597 | 0.755 | 2.471 |
|  | 1200 | 0.607 | 0.700 | 2.463 |
|  | 1300 | 0.610 | 0.774 | 2.484 |

TABLE 2B

|  | HW (cm$^{-1}$) | 138 − 0.06 · T | ANDOE CAPACITY (mAh/g) |
|---|---|---|---|
| COMPARATIVE EXAMPLE 1 | 64 | 72 | 296 |
|  | 55 | 66 | 248 |
|  | 51 | 60 | 216 |

As seen from comparison between Tables 1 and 2, the carbonaceous material made up in the embodiment 1 is such that HW, Ps, SI and $n_{ave}$ satisfy the predetermined conditions (HW>138−0.06·T, Ps <0.59, SI<0.76, $n_{ave}$<2.46), and has large anode capacity of 378 mAh. On the contrary, the carbonaceous materials made up in the comparative example 1 is such that all of HW, Ps, SI, $n_{ave}$ do not satisfy the predetermined condition, and has smaller anode capacity as compared to the carbonaceous material of the embodiment 1.

Accordingly, it has been found out from facts as described above that method of carrying out baking of carbon precursor under the inactive air flow atmosphere is such that HW, Ps, SI, $n_{ave}$ satisfy the predetermined condition, and is effective for obtaining carbonaceous material having large anode capacity.

Embodiment 2

Carbonaceous material was manufactured similarly to the embodiment 1 except that quantity of carbonized material laid into the crucible is set to 1g in baking carbonized material.

Then, Raman spectrum and X-ray diffraction spectrum were measured with respect to the carbonaceous material thus obtained to determine half width at half maximum of peak appearing in the vicinity of 1340 cm$^{-1}$ in the Raman scattering spectrum to further implement a predetermined data processing to data obtained from the X-ray diffraction spectrum to thereby determine ratio by weight of carbon in stacking structure Ps, stacking index SI and average number of carbon layers $n_{ave}$ in stacking structure. Moreover, the carbonaceous material thus obtained was used as anode material to make up a coin type battery to carry out charge/discharge under the current-imposed condition of 1 mA with respect to the coil type battery thus made up to measure discharge capacity with respect to anode carbonaceous material 1 g. Measured results of HW, Ps, SI, $n_{ave}$ and anode capacity are shown in Table 3.

TABLE 3

|  | Ps | SI | $n_{ave}$ | HW (cm$^{-1}$) | 138 − 0.06 · T | ANODE CAPACITY (mAh/g) |
|---|---|---|---|---|---|---|
| EMBODIMENT 2 | 0.525 | 0.706 | 2.426 | 86 | 72 | 442 |

As seen from the Table 3, with respect to the carbonaceous material manufactured by the above-mentioned method, all of HW, Ps, SI and $n_{ave}$ satisfy the predetermined condition, and anode capacity takes a value of 442 mAh/g greater than that in the case of the carbonaceous material of the embodiment 1.

From facts as described above, it has been found that, in carbonaceous material obtained by baking carbon precursor under the inactive gas flow atmosphere, anode capacity is dependent upon not only flow rate of inactive air flow in baking carbon precursor, but also quantity of carbon precursor to be baked, and according as inactive air flow quantity per carbon precursor 1 g becomes greater, anode capacity becomes greater value.

Embodiment 3

Carbonaceous material was manufactured similarly to the embodiment 1 except that, in baking carbonized material, alumina boat is used in place of crucible and carbonized material is mounted on the alumina boat. In this embodiment, layer thickness of carbonized material on the alumina boat was about 10 mm, and the area in contact with nitrogen gas flow was ~300 cm².

Then, Raman spectrum and X-ray diffraction spectrum were measured with respect to the carbonaceous material thus obtained to determine half width at half maximum of peak appearing in the vicinity of 1340 cm⁻¹ in Raman scattering spectrum to further implement a predetermined data processing to data obtained from the X-ray diffraction spectrum to thereby determine ratio by weight of carbon Ps, stacking index SI and average number of carbon layers $n_{ave}$ in stacking structure. Moreover, the carbonaceous material thus obtained was used as anode material to make up a coin type battery to carry out charge/discharge under the current-imposed condition of 1 mA with respect to the coin type battery made up to measure discharge capacity per anode carbonaceous material 1g. Measured results of HW, Ps, SI, $n_{ave}$ and anode capacity were shown in Table 4.

TABLE 4

|  | Ps | SI | $n_{ave}$ | HW (cm⁻¹) | 138 − 0.06 · T | ANODE CAPACITY (mAh/g) |
|---|---|---|---|---|---|---|
| EMBODIMENT 3 | 0.499 | 0.675 | 2.443 | 79 | 72 | 432 |

As seen from Table 4, with respect to the carbonaceous material made up by the above-mentioned method, all of HW, Ps, SI and $n_{ave}$ satisfy the predetermined condition, and anode capacity takes a value of 432 mAh/g greater than that in the case of the carbonaceous material of the embodiment 1.

From facts as above, it has been found out that in the carbonaceous material obtained by baking carbon precursor under the inactive gas flow atmosphere, anode capacity is dependent upon layer thickness, i.e., contact area of carbon precursor in baking the carbon precursor, and according as layer thickness of the carbon precursor becomes thin, and the contact area thereof becomes greater, the anode capacity takes a greater value. This is because volatile component is more satisfactorily gone in the case where layer thickness of carbon precursor becomes thinner.

Embodiment 4

Carbonaceous material was manufactured similarly to the embodiment 1 except that, in baking carbonized material, about 10g of the carbonized material is laid into the crucible to bake it, while keeping pressure within electric furnace at about 20 kPa, under the condition of temperature elevation speed of 5° C./min., arrival temperature of 1100° C., 1200° C. and 1300° C., and holding time at the arrival temperature of one hour.

Then, Raman spectrum and X-ray diffraction spectrum were measured with respect to the carbonaceous material thus obtained to determine half width at half maximum of peak appearing in the vicinity of 1340 cm⁻¹ in Raman Scattering spectrum to further implement a predetermined data processing to data obtained from the X-ray diffraction spectrum to thereby determine ratio by weight of carbon Ps, stacking index SI, and average number of carbon layers $n_{ave}$ in stacking structure. Moreover, the carbonaceous material was used as anode material to make up a coin type battery to carry out charge/discharge under the current-imposed condition of 1 mA with respect to the coin type battery thus made up to measure discharge capacity per anode carbonaceous material 1 g. Measured results of HW, Ps, SI, $n_{ave}$ and anode capacity are shown in Table 5.

TABLE 5A

|  | BAKING TEMPERATURE (°C.) | Ps | SI | $n_{ave}$ |
|---|---|---|---|---|
| EMBODIMENT 4 | 1100 | 0.504 | 0.670 | 2.408 |
|  | 1200 | 0.527 | 0.700 | 2.410 |
|  | 1300 | 0.568 | 0.731 | 2.415 |

TABLE 5B

|  | HW (cm⁻¹) | 138 − 0.06 · T | ANDOE CAPACITY (mAh/g) |
|---|---|---|---|
| EMBODIMENT 4 | 88 | 72 | 463 |
|  | 79 | 66 | 437 |
|  | 70 | 60 | 383 |

COMPARATIVE EXAMPLE 2

Carbonaceous material was manufactured similarly to the embodiment 4 except that pressure within the electric furnace is set to 60 kPa in baking carbonized material.

Then, Raman spectrum and X-ray diffraction spectrum were measured with respect to the carbonaceous material thus obtained to determine half width at half maximum of peak appearing in the vicinity of 1340 cm$^{-1}$ in Raman scattering spectrum to further implement a predetermined data processing to data obtained from the X-ray diffraction spectrum to thereby determine ratio by weight of carbon Ps, stacking index SI, and average number of carbon layers $n_{ave}$ in stacking structure. Moreover, the carbonaceous material was used as anode material to make up a coin type battery to carry out charge/discharge under the current-imposed condition 1 mA with respect to the coin type battery thus made up to measure discharge capacity per anode carbonaceous material 1 g.

As a result, HW, Ps, SI, $n_{ave}$ and anode capacity of the carbonaceous material of the comparative example 2 are the same order as that in the case of the comparative example 1, i.e., the above-mentioned parameters do not satisfy the predetermined condition, and the anode capacity is also small. On the contrary, in the case of the carbonaceous material of the embodiment 4, as seen from the Table 5, HW, Ps, SI, $n_{ave}$ satisfy the predetermined condition, and has an anode capacity far greater than that of the carbonaceous material of the comparative example 2.

Accordingly, it has been found out from facts as described above that a method of baking carbon precursor under the low pressure atmosphere results in the fact that HW, Ps, SI, $n_{ave}$ satisfy the predetermined condition, and is effective for obtaining carbonaceous material having large anode capacity.

Embodiment 5

Carbonaceous material was manufactured similarly to the embodiment 1 except that baking of carbonized material is carried out in a manner described below.

Namely, about 10 g of carbonized material was laid into the crucible to bake it at 900° C. within an enclosed electric furnace. After temperature is lowered, about 10 g was laid into the crucible for a second time to bake it, while keeping pressure within the electric furnace at about 20 kPa, under the condition of temperature elevation speed of 5° C./min., arrival temperature 1100° C., and holding time at the arrival temperature of one hour. Thus, carbonaceous material was obtained.

Then, Raman spectrum and X-ray diffraction spectrum were measured with respect to the carbonaceous material thus obtained to determine half width at half maximum of peak appearing in the vicinity of 1340 cm$^{-1}$ in Raman spectrum to further implement a predetermined data processing to data obtained from the X-ray diffraction spectrum to thereby determine ratio by weight of carbon Ps, stacking index SI, and average number of carbon layers $n_{ave}$ in stacking structure. Moreover, the carbonaceous material thus obtained was used as anode material to make up a coin type battery to carry out charge/discharge under the current-imposed condition of 1 mA with respect to the coin type battery thus made up to measure discharge capacity per anode carbonaceous material 1 g.

As a result, HW, Ps, SI, $n_{ave}$ and anode capacity of carbonaceous material were the same order as that of the carbonaceous material of the embodiment 4. From facts as described above, it has been found out that, in baking carbon precursor under the low pressure atmosphere to obtain carbonaceous material, even if evacuating operation is carried out before carbonization furnace or carbon precursor is heated, or in the process of temperature elevation or for a time period during which arrival temperature is held, HW, Ps, SI, $n_{ave}$ similarly satisfy the predetermined condition, and carbonaceous material having high anode capacity is obtained.

COMPARATIVE EXAMPLE 3

Initially, carbonized material was manufactured similarly to the embodiment 1.

About 10 g of carbonized material thus obtained was laid into the crucible to bake it at 900° C. within an enclosed electric furnace. After temperature is lowered, about 10 g was laid into the crucible for a second time to bake it under the condition of temperature elevation speed of 5° C./min., arrival temperature of 1100° C., and holding time at the arrival temperature of one hour within the enclosed electric furnace. Thus, carbonaceous material was obtained.

Then, Raman spectrum and X-ray diffraction spectrum were measured with respect to the carbonaceous material thus obtained to determine half width at half maximum of peak appearing in the vicinity of 1340 cm$^{-1}$ in Raman scattering spectrum to further implement a predetermined data processing to data obtained from the X-ray diffraction spectrum to thereby determine ratio by weight of carbon Ps, stacking index SI, and average number of carbon layers $n_{ave}$ in stacking structure. Moreover, the carbonaceous material thus obtained was used as anode material to make up a coin type battery to carry out charge/discharge under the current-imposed condition of 1 mA with respect to the coin type battery thus made up to measure discharge capacity per anode carbonaceous material 1 g.

As a result, HW, Ps, SI, $n_{ave}$ and anode capacity of carbonaceous material were the same order as that of the carbonaceous material of the comparative example 1. Also from facts as described above, it has been found out that it is important that pressure of the atmosphere is caused to be low at the time of arrival temperature in baking carbon precursor under the low pressure atmosphere to obtain carbonaceous material.

Embodiment 6

Furfuryl alcohol resin was baked, while keeping pressure within the electric furnace at about 20 kPa, under the condition of temperature elevation speed of 5° C./min., arrival temperature of 1200° C., and holding time of one hour. Thus, carbonaceous material was obtained. After the carbonaceous material thus obtained was cooled, it was crushed by mill, and was split into particles less than 38 μm by mesh.

Then, Raman spectrum and X-ray diffraction spectrum were measured with respect to the carbonaceous material thus obtained to determine half width at half maximum of peak appearing in the vicinity of 1340 cm$^{-1}$ in Raman scattering spectrum to further implement a predetermined data processing to data obtained from the X-ray diffraction spectrum to thereby determine ratio by weight of carbon Ps, stacking index SI, and average number of carbon layers $n_{ave}$ in stacking structure. Moreover, the carbonaceous material thus obtained was used to make up a coin type battery to carry out charge/discharge under the current-imposed condition of 1 mA with respect to the coin type battery thus made up to measure discharge capacity per anode carbonaceous material 1 g. Measured results of HW, Ps, SI, $n_{ave}$ and anode capacity are shown in Table 6.

TABLE 6

|  | Ps | SI | $n_{ave}$ | HW (cm$^{-1}$) | 138 − 0.06·T | ANODE CAPACITY (mAh/g) |
|---|---|---|---|---|---|---|
| EMBODIMENT 6 | 0.570 | 0.737 | 2.452 | 90 | 66 | 403 |

COMPARATIVE EXAMPLE 4

Carbonaceous material was manufactured similarly to the embodiment 6 except that baking of furfuryl alcohol was carried out within an enclosed electric furnace.

Then, Raman spectrum and X-ray diffraction spectrum were measured with respect to the carbonaceous material thus obtained to determine half width at half maximum of peak appearing in the vicinity of 1340 cm$^{31}$ $^1$ in Roman scattering spectrum to further implement a predetermined data processing to data obtained from the X-ray diffraction spectrum to thereby determine ratio by weight of carbon Ps, stacking index SI, and average number of carbon layers $n_{ave}$ in stacking structure. Moreover, the carbonaceous material thus obtained was used as anode material to make up a coin type battery to carry out charge/discharge under the current-imposed condition of 1 mA with respect to the coin type battery thus made up to measure discharge capacity per anode carbonaceous material 1 g. Measured results of HW, Ps, SI, $n_{ave}$ and anode capacity are shown in Table 7.

TABLE 7

|  | Ps | SI | $n_{ave}$ | HW (cm$^{-1}$) | 138 − 0.06·T | ANODE CAPACITY (mAh/g) |
|---|---|---|---|---|---|---|
| COMPARATIVE EXAMPLE 4 | 0.583 | 0.764 | 2.475 | 65 | 66 | 282 |

As seen from comparison between Tables 6 and 7, the carbonaceous material of the embodiment 6 is such that HW, Ps, SI, $n_{ave}$ have satisfy the predetermined condition, and has an anode capacity greater than that of the carbonaceous material of the comparative example 4. On the contrary, the carbonaceous material of the comparative example 4 is such that HW, Ps, SI, $n_{ave}$ do not satisfy the predetermined condition, and has a smaller anode capacity.

From facts as above, it has been found out that this manufacturing method is effective also when organic material which becomes non-graphitizable carbon by baking is used as carbon precursor similarly to petroleum pitch in which functional group including oxygen is introduced.

What is claimed is:

1. An anode material comprising:
   non-graphitizable carbon material obtained by baking a carbon precursor,
   wherein said material exhibits a portion having a stacking structure and a portion with a non-stacking structure such that a ratio (Ps) by weight of carbon in said stacking structure portion compared to said non-stacking structure portion is less than 0.59 or a stacking index (SI) of said material is less than 0.76.

2. An anode material as set forth in claim 1, wherein an average number of carbon layers ($n_{ave}$) in said stacking structure portion is less than 2.46.

3. An anode material as set forth in claim 1, wherein said ratio is determined from a diffraction peak originating in a (002) crystal lattice plane and X-ray diffraction spectrum components on the lower angle side with respect to the diffraction peak originating in the (002) crystal lattice plane of the X-ray diffraction spectrum.

4. An anode material comprising non-graphitizable carbon material produced by baking a carbon precursor, wherein when:
   a baking temperature is T° C., and
   a half width at half maximum of a peak appearing in the vicinity of 1340 cm$^{-1}$ in a Raman spectrum is HW,
   HW>138−0.06·T.

5. A method of manufacturing an anode material, wherein a carbon precursor which becomes non-graphitizable carbon when baked is caused to undergo heat treatment at a temperature of approximately 600° C. or more under an inactive gas atmosphere which has a flow rate of 0.1 ml/sec. per 1 gram of said carbon precursor.

6. A nethod of manufacturing an anode material as set forth in claim 5, wherein, in carrying out said heat treatment, said carbon precursor is mounted in a layer form so that the area in contact with the atmosphere is approximately 10 cm$^2$ or more per 1 Kg.

7. A method of manufacturing an anode material, wherein a carbon precursor which becomes non-graphitizable carbon when baked is caused to undergo heat treatment at a temperature of approximately 600° C. or more under an atmosphere having a pressure of approximately 50 kPa or less.

8. An anode comprising non-easily graphitized carbon material obtained by baking a carbon precursor, wherein a weight ratio (Ps) of carbon which takes a stacked layered structure, which ratio is obtained from a diffraction peak originating in a (002) crystal lattice plane and X-ray diffraction spectrum components on the lower angle side with respect to the diffraction peak originating in the (002) crystal lattice plane of X-ray diffraction spectrum, is smaller than 0.59 or a stacking index (SI) thereof is smaller than 0.76.

9. An anode as set forth in claim 8, wherein an average number of carbon layers ($n_{ave}$) in said stacked layer structure as determined from a diffraction peak originating in a (002) crystal lattice plane and X-ray diffraction spectrum components on the lower angle side with respect to the diffraction peak originating in the (002) crystal lattice plane of X-ray diffraction spectrum, is smaller than 2.46.

10. An anode material comprising non-easily graphitized carbon material wherein when a baking temperature is T° C. and a half width at half maximum of a peak appearing in the vicinity of 1340 cm$^{-1}$ in a Raman spectrum is HW, then HW>138−0.06·T.

11. An anode material comprising:

non-graphitizable carbon material, wherein said material exhibits a portion having a stacking structure and a portion with a non-stacking structure such that a ratio (Ps) by weight of carbon in said stacking structure portion compared to said non-stacking structure portion is less than 0.59 or a stacking index (SI) of said material is less than 0.76.

12. An anode material as set forth in claim 11, wherein an average number of carbon layers ($n_{ave}$) in said stacking structure portion is less than 2.46.

* * * * *